US011541696B2

(12) United States Patent
Hicks et al.

(10) Patent No.: US 11,541,696 B2
(45) Date of Patent: Jan. 3, 2023

(54) PNEUMATIC TIRE

(71) Applicant: COMPAGNIE GENERALE DES ETABLISSEMENTS MICHELIN, Clermont-Ferrand (FR)

(72) Inventors: Bradford M. Hicks, Greer, SC (US); Paul B. Winston, Greer, SC (US); Mary Dungan Thomas, Fountain Inn, SC (US); Donald Earl Leonard, Simpsonville, SC (US); Vittoria Madonna Blasucci, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 91 days.

(21) Appl. No.: 16/768,517

(22) PCT Filed: Nov. 30, 2017

(86) PCT No.: PCT/US2017/064011
§ 371 (c)(1),
(2) Date: May 29, 2020

(87) PCT Pub. No.: WO2019/108207
PCT Pub. Date: Jun. 6, 2019

(65) Prior Publication Data
US 2020/0384811 A1    Dec. 10, 2020

(51) Int. Cl.
| *B60C 5/14*  | (2006.01) |
| *B60C 15/06* | (2006.01) |
| *B60C 15/00* | (2006.01) |

(52) U.S. Cl.
CPC .......... *B60C 15/0027* (2013.01); *B60C 15/06* (2013.01); *B60C 2005/145* (2013.01);
(Continued)

(58) Field of Classification Search
CPC ........ B60C 15/0603; B60C 2015/0614; B60C 2015/0617; B60C 2015/0621; B60C 2015/0625; B60C 2005/145
See application file for complete search history.

(56) References Cited

U.S. PATENT DOCUMENTS

| 5,318,088 A | 6/1994 | Billieres |
| 5,499,670 A | 3/1996 | Billieres |
(Continued)

FOREIGN PATENT DOCUMENTS

| EP | 2910391 A1 | 8/2015 |
| FR | 2730190 A1 | 8/1996 |
(Continued)

OTHER PUBLICATIONS

Machine Translation: JP-2015089784-A, Akabori Yayoi, (Year: 2021).*

(Continued)

*Primary Examiner* — Kendra Ly
(74) *Attorney, Agent, or Firm* — Hahn Loeser & Parks LLP; Bret A. Hrivnak

(57) ABSTRACT

A pneumatic tire having a pair of annular bead areas (12), a pair of sidewalls, and a crown portion wherein a carcass ply (22) wraps around a radial inner side (RSj,2o) of each bead ring (20), for each bead area (12) a first layer of rubber material (30) is arranged radially inward from both the bead ring radial inner side (RSi,2o) and the carcass ply (22) and a second layer of rubber material (40) is arranged radially inward from the first layer of rubber material (30), each of the first layer of rubber material (30) and the second layer of rubber material (40) extending substantially across a full width (W20) of the corresponding bead ring (20), each of the first and second layer of rubber material (30, 40) having a modulus of elongation, where the modulus of elongation of the second layer of rubber material (40) is equal to or greater (Continued)

than substantially 125% of the modulus of elongation of the first layer of rubber material (30).

13 Claims, 4 Drawing Sheets

(52) U.S. Cl.
CPC ............... *B60C 2015/065* (2013.01); *B60C 2015/0614* (2013.01); *B60C 2015/0617* (2013.01)

(56) References Cited

U.S. PATENT DOCUMENTS

| | | | |
|---|---|---|---|
| 5,688,345 | A | 11/1997 | Billieres |
| 5,700,339 | A | 12/1997 | Billieres |
| 5,849,117 | A | 12/1998 | Billieres |
| 6,044,885 | A | 4/2000 | Kato |
| 6,079,467 | A * | 6/2000 | Ueyoko ............... B60C 15/06 152/539 |
| 6,427,743 | B1 * | 8/2002 | Ueyoko ............... B60C 5/142 152/525 |
| 6,651,715 | B2 | 11/2003 | Kato |
| 2002/0079038 | A1 | 6/2002 | Kato |
| 2002/0179215 | A1 | 12/2002 | Farinola |
| 2007/0074799 | A1 | 4/2007 | Nakane et al. |
| 2010/0147436 | A1 | 6/2010 | Pingenat et al. |
| 2012/0160392 | A1 | 6/2012 | Van Riper |
| 2016/0121665 | A1 | 5/2016 | Moldenhauer |

FOREIGN PATENT DOCUMENTS

| | | | | |
|---|---|---|---|---|
| FR | 2781723 | A1 | | 2/2000 |
| JP | H0310916 | A | | 1/1991 |
| JP | H06156025 | A | | 6/1994 |
| JP | 2002052909 | A | | 2/2002 |
| JP | 2004168244 | A | | 6/2004 |
| JP | 2008037367 | A | | 2/2008 |
| JP | 2009126360 | A | | 6/2009 |
| JP | 2009227236 | A | * | 10/2009 |
| JP | 2011246086 | A | | 12/2011 |
| JP | 4934241 | B2 | | 5/2012 |
| JP | 2014125180 | A | | 7/2014 |
| JP | 2014129002 | A | | 7/2014 |
| JP | 2015089784 | A | * | 5/2015 |
| KR | 20130049548 | A | | 5/2013 |
| WO | WO-2013150024 | A1 | * | 10/2013 ............... B60C 1/00 |

OTHER PUBLICATIONS

Machine Translation: JP-2009227236-A, Ito K, (Year: 2022).*
Machine Translation: WO-2013150024-A1, Ahouanto M, (Year: 2022).*
International Search Report and Written Opinion for PCT/US2017/064011 dated Apr. 4, 2018.

* cited by examiner

PNEUMATIC TIRE

FIELD

Embodiments of this disclosure relate generally to pneumatic tires, and more specifically to tubeless pneumatic tires.

BACKGROUND

The invention concerns the structures and production of tubeless tires having rim mounting and sealing portions each characterized as having improved resistance to rim mounting damage.

Tubeless pneumatic tires having one or more carcass plies extending between a pair of substantially unstretchable bead rings (which may be more simply referred to herein as "beads"), one or more carcass plies being surmounted by a crown reinforcement (referred to also as a belt or belt package) and a tread, the one or more carcass plies being partially wound at each of their two ends around each of the bead rings. Each of the one or more carcass plies and crown reinforcement being reinforced with cables or cords within a rubber matrix.

In the case of tubeless tires, it is necessary that the pressurized inflation atmosphere not be lost by diffusion into the materials of the mounted assembly or by leaks caused by an inadequate seal between tire and rim. Additionally, the structure forming the seal together with the surrounding portions near each bead ring must withstand mounting forces observed when mounting the tire on a rim or dismounting the tire from rim.

Presently, there is a desire to improve the ability of the sealing portion of the tire, or more specifically, the portion of the tire arranged between each bead ring and the radially inner rim-seating portion of the tire as is arranged within a bead area of the tire, to provide sealing capabilities while also better resisting the occurrence of damage that may occur during tire mounting or tire dismounting.

SUMMARY

Embodiments of this disclosure include various pneumatic tires, which may be tubeless, the tires having: a pair of annular beads areas spaced apart axially along a rotational axis of the tire; a pair of sidewalls spaced apart axially along the rotational axis of the tire, each sidewall of the pair of sidewalls extending outwardly in a radial direction from one bead area of the pair of bead areas; and, a crown portion arranged between the pair of sidewalls. For each bead of the pair of bead areas, a carcass ply wraps around a radial inner side of a bead ring such that the carcass ply extends along an axial outer side of the bead ring, across a radial inner side of the bead ring, and an axial inner side of the bead ring, the carcass ply comprising an array of reinforcements arranged within a matrix of elastomeric material. In particular embodiments, for each bead area of the pair of bead areas, a first layer of rubber material is arranged radially inward from both the bead ring radial inner side and the carcass ply. Further, for each bead area of the pair of bead areas, a second layer of rubber material is arranged radially inward from each of the bead ring radial inner side, the carcass ply, and the first layer of rubber material, each of the first layer of rubber material and the second layer of rubber extending substantially across a partial or full width of the corresponding bead ring. Each of the first layer of rubber and the second layer of rubber having a modulus of elongation, where the modulus of elongation of the second layer of rubber material is equal to or greater than substantially 125% of the modulus of elongation of the first layer of rubber material.

The foregoing and other objects, features, and advantages will be apparent from the following more detailed descriptions of particular embodiments, as illustrated in the accompanying drawings wherein like reference numbers represent like parts of particular embodiments.

DETAILED DESCRIPTION OF THE DRAWINGS

DETAILED DESCRIPTION OF PARTICULAR EMBODIMENTS

The following terms are defined as follows for this disclosure:

"Rubber" or "rubber material" as used herein, alone and without modification, indicates any natural rubber (polyisoprene), synthetic rubber, or any blend thereof. Synthetic rubbers include, by example and without limitation, butadiene rubbers (BR), styrene-butadiene rubbers (SBR), isoprene, chloroprene, and isobutylene.

"Axial direction," "axially," or the letter "$A_d$" in the figures refers to a direction extending along the axis of rotation or a direction parallel to the axis of rotation of, for example, the outer band, the inner hub, or more generally, the non-pneumatic tire carcass.

"Radial direction," "radially," or the letter "$R_d$" in the figures refers to a direction that is orthogonal to the axis of rotation and extends in the same direction as any radius extending orthogonally from the rotational axis.

"Circumferential direction" or the letter "Ca" in the figures refers to a direction is orthogonal to an axial direction and orthogonal to a radial direction.

"Elastic material" or "elastomer" as used herein refers to a polymer exhibiting rubber-like elasticity, such as a material comprising rubber, whether natural, synthetic, or a blend of both natural and synthetic rubbers.

"Elastomeric" as used herein refers to a material comprising an elastic material or elastomer, such as a material comprising rubber.

"Modulus" or "Modulus of elongation" (MPa) was measured at 10% strain (MA10) at a temperature of 23° C. based on ASTM Standard D412 on dumb bell test pieces. The measurements were taken in the second elongation; i.e., after an accommodation cycle. These measurements are secant moduli in MPa, based on the original cross section of the test piece.

The tear resistance indices are measured at 60° C. on an INSTRON type 4465 or similar machine. The breaking load (FRD) is in N/mm of thickness and the elongation at break (ARD) in percentage and are measured on a test piece of dimensions 10×145×2.5 mm notched with 3 notches that are perpendicular to the side, each notch extending 3 mm from the side, a center notch spaced about 72 mm from the top of the test piece and the other two spaced 6 mm on either side of the center notch. The "tear resistance index" (TR) is then provided by the following equation: TR=(FRD*ARD)/100.

Figure 1:
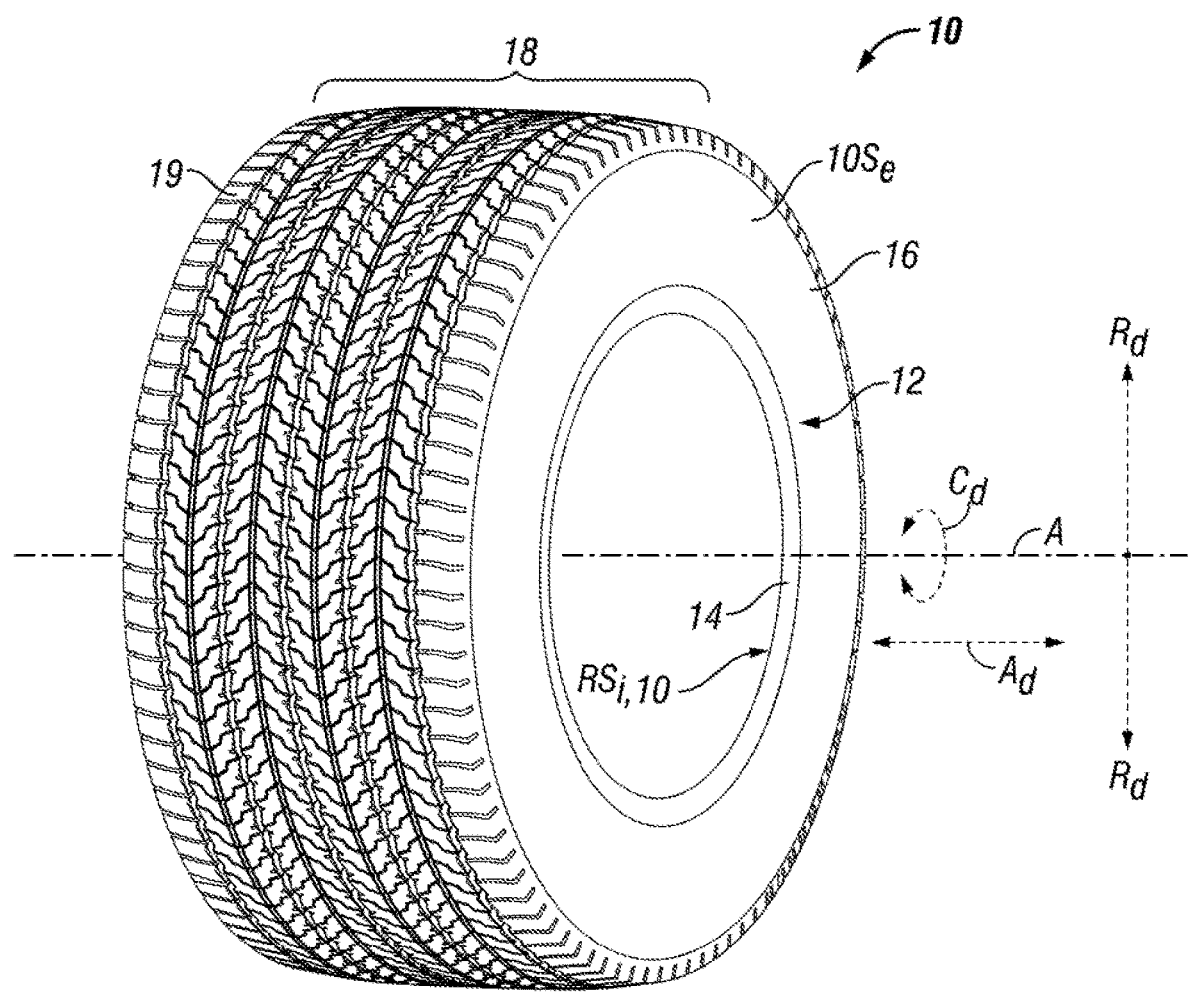
FIG. 1 is a perspective view of a tubeless pneumatic tire, in accordance with an exemplary embodiment.

With reference to an exemplary tubeless pneumatic tire 10 in FIG. 1, tire 10 includes a pair of annular bead areas 12. Internally within each bead area 12 various components are arranged, including a bead ring (not shown, but shown in FIGS. 2 and 3). Each bead ring 12 is also referred to as a bead herein. Each bead ring is substantially unstretchable under the normal loading conditions observed during intended tire installation and operation, and it is appreciated that each bead ring may comprise any desired bead ring. The pair of bead areas 12, as well as the pair of beads arranged therein, are spaced apart axially along a rotational axis A of the tire 10. Each bead area includes a rim sealing portion 14 arranged between each bead and a radial inner side $RS_{i,10}$ of tire 10 within bead area 12, each of the rim sealing portion 14 and radial inner side $RS_{i,10}$ extending circumferentially (in a circumferential direction Ca) around the tire 10.

With continued reference to FIG. 1, tire 10 also includes a pair of sidewalls 16 spaced apart axially along the rotational axis A of tire 10. Each sidewall 16 extends outwardly in a radial direction $R_d$ from one bead area 12. Tire 10 also includes a crown portion 18 arranged between the pair of sidewalls 16. In the embodiment shown, the crown portion 18 includes a tread 19 arranged along a radially outer side of the crown portion to form an outer, ground-engaging side of the tire 10. Tread 19 is employed to create traction during tire operation.

Figure 2:
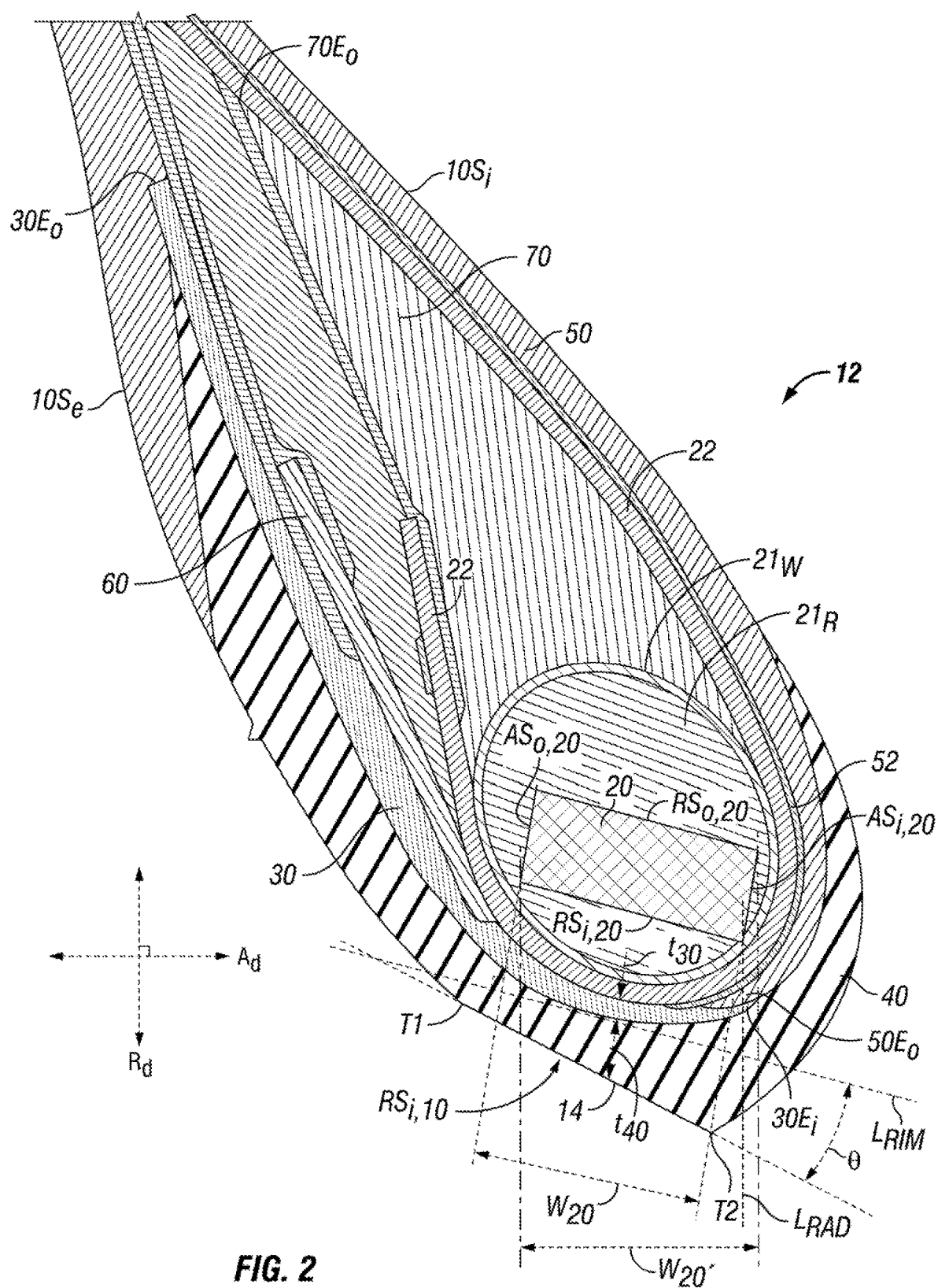
FIG. 2 is a perspective view of a bead portion located at the radially inner end of a sidewall, in accordance with an exemplary embodiment.

With reference now to FIG. 2, showing one of the bead areas 12 of the tire 10 shown in FIG. 1, the bead area 12 being constructed in accordance with one variation of various variations contemplated herein. In the variation shown, each bead area 12 includes a carcass ply 22 that wraps around a radial inner side $RS_{i,20}$ of a bead ring 20 such that the carcass ply 22 extends along an axial outer side $AS_{o,20}$ of the bead ring 20, across the radial inner side $RS_{i,20}$ of the bead ring 20 (which is also referred to as a bottom side of the bead ring), and an axial inner side $AS_{i,20}$ of the bead ring 20. In extending along the axial outer side $AS_{o,20}$ and/or the axial inner side $AS_{i,20}$, in certain variations the carcass ply 22 may continue extending radially outward and into a corresponding sidewall 16. It is appreciated that the carcass ply may generally extend radially across the crown portion 18 and to each bead ring 20, whether the carcass ply is a continuous ply or is formed of multiple, connected portions. As appreciated by one of ordinary skill, carcass ply 22 comprises an array of reinforcements arranged within a matrix of elastomeric material (not shown). For example, such reinforcements may comprise elongate cables or cords.

Bead ring 20 is optionally surrounded by a rubber stiffener $21_R$ and an outer wrap $21_W$. Bead ring 20 is configured to remain rigid annularly (that is, in a hoop direction) and comprises one or more rigid reinforcements, such one or more metal reinforcements, for example. Generally, it is appreciated that bead ring 20 may comprise any desired bead known to one of ordinary skill. In this exemplary embodiment, rubber stiffener $21_R$ is arranged around bead 21, both in an annular direction and around the bead ring cross-section taken along a plane extending in both radial and axial directions. Rubber stiffener $21_R$ is a rigid rubber formulation designed to increase the rigidity of bead ring 20. A wrap $21_W$ is arranged around rubber stiffener $21_R$ to contain the rubber stiffener $21_R$. Wrap $21_W$ may consist of a rubber material that may or may not include reinforcements, such as any elongate textile or metal reinforcements, for example.

With continued reference to FIG. 2, each bead area 12 includes a first layer of rubber material 30 arranged radially inward from both the bead ring radial inner side $RS_{i,20}$ and the carcass ply 22. Each bead area 12 also includes a second layer of rubber material 40 arranged radially inward from each of the bead ring radial inner side $RS_{i,20}$, the carcass ply 22, and the first layer of rubber material 30. Each of the first and second layers of rubber material 30, 40 are formed of different rubber material, such that the second layer of rubber material 40 is substantially more rigid (that is, less flexible) than the first layer of rubber material 30. It is appreciated that each of the first layer of rubber 30 and the second layer of rubber 40 have a modulus of elongation, where the modulus of elongation of the second layer of rubber material 40 is greater than the modulus of elongation of the first layer of rubber material 30. For example, in particular instances the modulus of elongation of the second layer of rubber material 40 is at least 125% of the modulus of elongation of the first layer of rubber material 30 or in other variations equal to 150% to 250% of the modulus of elongation of the first layer of rubber material 30. In other variations, the modulus of elongation of the second layer of rubber material 40 is equal to 175% to 225% of the modulus of elongation of the first layer of rubber material 30. In yet further variations, the modulus of elongation of the second layer of rubber material 40 is at least equal to substantially 200% of the modulus of elongation of the first layer of rubber material 30. In still further variations, the modulus of elongation of the second layer of rubber material 40 is equal to substantially 200% of the modulus of elongation of the first layer of rubber material 30. For any of the variations, in particular exemplary instances the modulus of elongation for the first layer of rubber material 30 is not less than substantially 3 MPa and in more specific instances, is substantially in the range of 3 to 6 MPa. Also, for any of the variations, in particular exemplary instances the modulus of elongation for the second layer of rubber material 40 is substantially 7.5 MPa, or more generally 6 MPa to 8 MPa. This first layer 30 can also be described as having desirous cohesion properties, that is, a resistance to tearing. These properties can be quantified as having a particular tear force at a particular temperature. In particular instances, the tear force (breaking load) for the first layer 30 is 30 to 54 N/mm (Newton/millimeters) at 60° C. where the elongation at maximum force (breaking load) is 160% to 360% (percent), to provide tear resistance indices of 48 to 194. In more specific variations, a tear force (breaking load) of substantially 42 N/mm at 60° C. where the elongation at maximum force (breaking load) is substantially 260%, to provide a tear resistance index of 109.

It is appreciated that the first layer of rubber material 30 has a thickness $t_{30}$ and the second layer of rubber material 40 has a thickness $t_{40}$. At least below the radial inner side $RS_{i,20}$ of the bead ring 20, the first layer thickness $t_{30}$ is at least substantially 1 millimeter (mm) and upwards of substantially 50% of the combined thickness ($t_{30}+t_{40}$) of the first layer of rubber material 30 and the second layer of rubber material 40 or substantially 50% of a distance extending in the direction of each layer thickness $t_{30}$, $t_{40}$ between the carcass 22 and the inner radial side $RS_{i,10}$ of tire 10. At least below the radial inner side $RS_{i,20}$ of the bead ring 20, the second layer thickness $t_{40}$ is at least substantially 1 millimeter (mm) and as great as a thickness that fills the distance remaining between the carcass 22 and the inner radial side $RS_{i,10}$ of tire 10 when the first layer 30 is at a minimum thickness $t_{30}$ (e.g., 1 mm). For the purpose of clarity, the portion of each first and second layer of rubber material 30, 40 arranged below a bead ring 20 is the portion extending at least partially across or substantially the full width $W_{20}$ or $W_{20'}$ of the bead ring 20. Accordingly, it is appreciated that the thickness $t_{30}$, $t_{40}$ of other portions of each layer 30, 40 may be greater or less than the minimums and maximums described above.

It is also appreciated that while the second layer of rubber material 40 is shown extending along an exterior side $10S_e$ of the tire, in other variations at least a portion or all of the second layer of rubber material 40 does not extend along an exterior side $10S_e$ of the tire, as one or more additional layers may be arranged radially inward of the second layer of rubber material 40. For example, a reinforcement layer or wrap may be arranged along an exterior side $10S_e$ of the radial inner side $RS_{i,10}$ of the tire 10 for the purpose of resisting surface abrasions and other damage that may occur during tire mounting, dismounting, or even tire operation.

It is understood that the first and second layers of rubber material 30, 40 may be each be formed of any desired rubber to achieve the rigidity or elongation properties described herein. Rubber may comprise natural rubber, synthetic rubber, or any rubber blend as noted previously. It is further appreciated that synthetic rubber may include any additives to achieve the material properties desired. It is appreciated that each of the first and second layers of rubber material 30, 40 are formed substantially or completely of rubber material, such that each does include any reinforcements, such as, for example and without limitation, any elongate cables or cords.

With specific regard to the first layer of rubber material 30, to provide sufficient tackiness, in certain instances the first layer of rubber material 30 is formed of at least substantially 50% natural rubber and up to substantially 100% natural rubber. When the first layer of rubber material 30 is formed of at least substantially 50% natural rubber and but less than substantially 100% natural rubber, in certain instances the first layer of rubber material 30 is a blend of natural rubber and synthetic rubber.

With specific regard to the second layer of rubber material 40, in certain instances the second layer of rubber material 40 is formed of a natural rubber and synthetic rubber blend, where in certain instances, the synthetic rubber comprises butadiene rubber. In particular instances, the second layer of rubber material 40 is formulated to provide both low high-strain rigidity and high low-strain rigidity and improved aged rigidity. To assess these properties, aged rigidity is induced by convection oven aging the specimens for 28 days at 77° C. Both aged modulus of elongation at 100% deformation and aged elongation at break are measured. Aged modulus at 100% should increase no more than 50% of the modulus of the unaged material. The aged elongation at break should decrease no more than 50% of the elongation of the unaged material.

Figure 4:
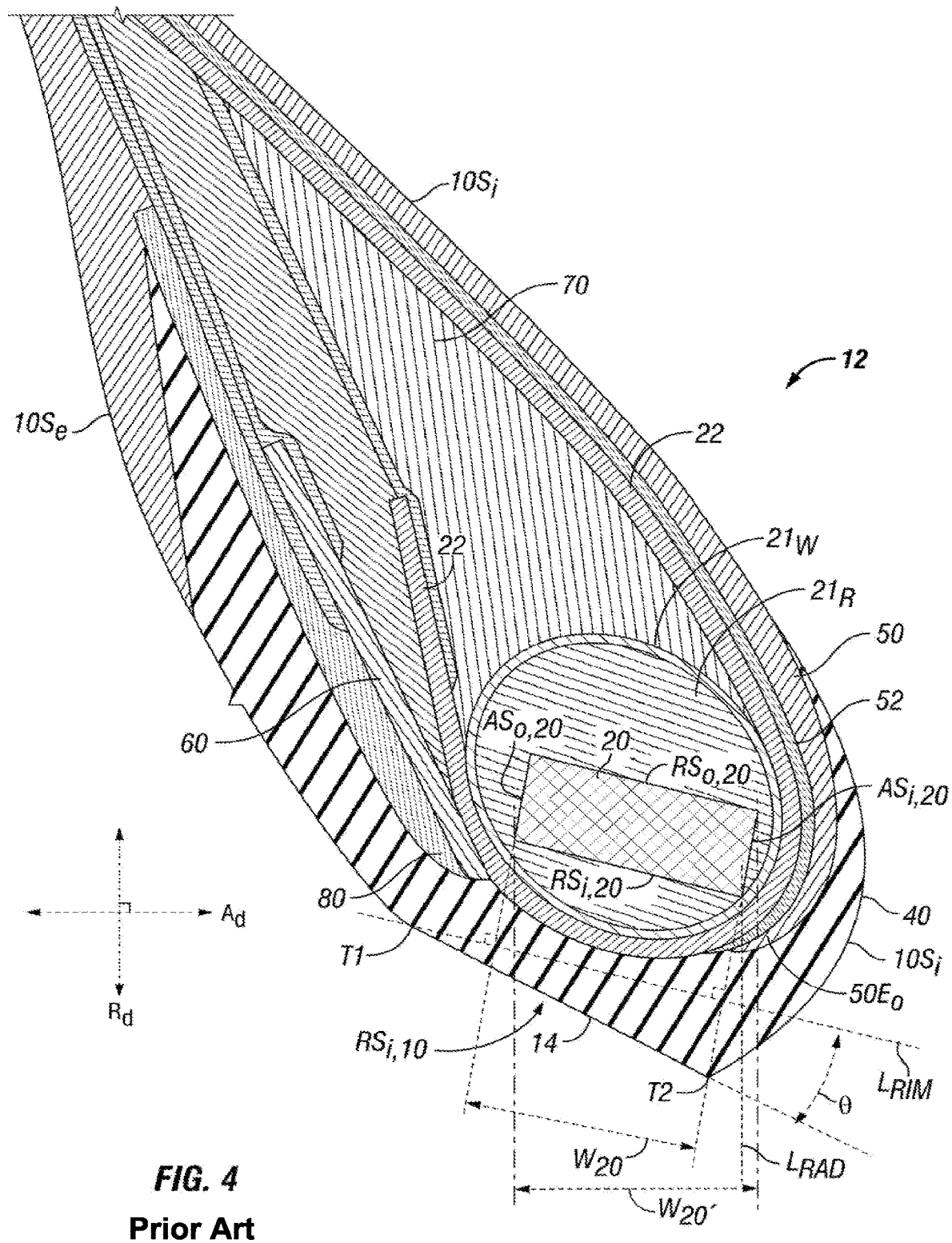

With reference again to FIG. 2, additional details regarding each bead area 12 are provided. Radial inner side $RS_{i,10}$ of tire 10 within bead portion 12 forms a rim sealing portion, which generally extends linearly in cross-section between a first transition T1 and to a second transition T2, where at the first transition T1 sealing portion transitions to an exterior side $10S_e$ of the tire and where at the second transition T2 sealing portion transitions to an interior side $10S_i$ of the tire 10, the exterior side $10S_e$ of the tire being located axially outward from the inner side of the tire. First transition T1 is referred to as a heel and the second transition T2 is referred to as a toe. It is noted that "rim sealing portion" is used interchangeably with "radial inner side" with regard to this embodiment. Line $L_{RIM}$ is a reference line representing a portion of a rim upon which the rim sealing portion 14 is intended to engage when tire 10 is properly mounted on a rim. In particular embodiments, the angularity of line $L_{RIM}$ is biased from rim sealing portion $RS_{i,10}$ by angle θ as measured from an origin located along the rim sealing portion $RS_{i,10}$ at the first transition T1 in a direction such that the line $L_{RIM}$ extends towards the interior side $10S_i$ of the tire between the second transition T2 and the bead ring 20. In particular embodiments, angle θ is substantially 15 degrees while in other instances, angle θ is substantially equal to 0 to 15 degrees. As measured in a direction parallel to line $L_R$, bead ring 20 has a width $W_{20}$. In the embodiment shown, first layer of rubber material 30 extends substantially across the full bead width $W_{20}$. In lieu of measuring the bead ring width $W_{20}$ in a direction parallel to a reference rim line $L_{RIM}$, the width of the bead ring 20 can be measured in an axial direction of the tire 10, with the tire in a molded or unmounted configuration. This alternative measurement of the bed ring width is represented by $W_{20'}$. In other variations, first layer 30 extends partially or at least 50% across width $W_{20}$, $W_{20'}$. Likewise, second layer 40 may extend partially, at least 50%, or substantially across width $W_{20}$, $W_{20'}$. With reference to FIG. 4, this arrangement of a first layer 30 extending substantially across a full width of the bead ring 20 is contrary to prior art bead areas 112, where no first layer of rubber material is arranged below the bead ring 20 let alone extending substantially across the full bead width $W_{20}$. Instead, an outer shear layer 80 is arranged along an axially outer side of the bead area 112 between a portion of second layer of rubber material 140 and reinforcement, where the outer shear layer 80 is flexible for the purpose of reducing strain densities along reinforcement ply 60. In certain embodiments, the outer shear layer 80 has a modulus of elongation generally ranging from 3 to 6 MPa in certain embodiments. Therefore, second layer of rubber material is the only rubber material arranged between carcass ply 22 and the rim sealing portion.

In addition to extending substantially across the full bead width $W_{20}$, it is appreciated that first layer of rubber material 30 may extend further toward the interior side $10S_i$ of the tire. For example, with reference to an exemplary embodiment in FIG. 2, first layer of rubber material 30 continues to an inner terminal end $30E_i$ located beyond a line $L_{RAD}$ that extends in a radial direction from a radially inner and axially inner corner of the bead 20. More specifically, first layer of rubber material 30 extends to an inner terminal end $30E_i$ that engages or overlaps an outer terminal end $50E_o$ of an inner liner ply 50, the inner liner ply 50 being an air impermeable layer of material that prevents the leakage of air through the tire between the seals formed along each pair of bead areas 12. Optionally, in the example shown, before engaging the inner liner 50, the first layer of rubber material 30 overlaps a second liner ply 52, which is formed of rubber material configured to react with oxygen to thereby prevent migration of oxygen. The second liner ply 52 is arranged between the inner liner ply 50 and the carcass ply 22. In another variation, the inner terminal end $30E_i$ of first layer 30 in the embodiment shown in FIG. 2 could instead be arranged between a carcass ply 22 and inner liner ply 50 and the second liner ply 52 if present, such as is exemplarily shown in FIG. 3. Stated differently, in the variation shown in FIG. 3, inner terminal end $30E_i$ is overlapped by outer terminal end $50E_o$ of an inner liner ply 50 and by optional second liner ply 52, Regardless, in other variations, it is appreciated that first layer of rubber material 30 may or may not terminate at an inner terminal end $30E_i$ prior to reaching an inner axial side $AS_{i,20}$ of the bead 20 or a corresponding sidewall 16.

In addition to extending substantially across the full bead width $W_{20}$, and in any variation concerning the location at which inner terminal end $30E_i$, first layer of rubber material 30 may also extend further towards the exterior side $10S_e$ of the tire, whereby outer terminal end $30E_o$ is arranged at any location from the radial inner side $RS_{i,20}$ to the axial outer side $AS_{o,20}$ and beyond to a corresponding sidewall 16. For example, with reference to an exemplary embodiment in FIG. 2, in certain instances, first layer of rubber material 30 continues in a direction radially outward along an outer axial side $AS_{o,20}$ of the bead 20 and into a corresponding sidewall 16. In this instance, first layer of rubber material is arranged adjacent a reinforcement ply 60. In the present example, the reinforcement ply 60 is a rubber matrix containing an array of elongate reinforcements, such as metal reinforcements, for example, but in other variations may comprise any desired reinforcement ply. Also, in the present example, the reinforcement ply 60 is arranged between the first layer of rubber material 30 and bead 20, and extends from an outer axial side $AS_{o,20}$ of the bead 20 and radially outward to terminate at a location within the bead area 12 below a radial outer terminal end $70E_o$ of a rubber filler 70. Rubber filler 70 is a rigid rubber material arranged along a radial outer side $RS_{o,20}$ and extends radially outward to a terminal end within the bead area 12, where a thickness of the rubber filler 70 narrows as the rubber filler extends radially outward to its radial outer terminal end $70E_o$. In particular embodiments, such as is shown, rubber filler 70 is characterized as having a triangular cross-section shape in a plane extending radially and axially. In particular embodiments, such as is shown, outer terminal end $30E_o$ of first layer 30 is arranged near the radial outer terminal end $70E_o$ of the rubber filler 70, and may terminate within 10 mm (radially below or beyond) of the radial outer terminal end $70E_o$. In lieu of extending along an axially outer side of the bead area 12, such as has been described in association with the embodiment of FIG. 2, the outer terminal end $30E_o$ of first layer 30 may instead terminate prior to extending radially outward along the axial outer side $RS_{o,20}$ of bead ring 20, such as is shown in one example in FIG. 3. Also, outer terminal end $30E_o$ can be described as being is located prior to reaching reinforcement ply 60 located along an outer axial side $AS_{o,20}$ of the bead 20. As a result, in the embodiment shown in FIG. 3, the elongated first layer 30 of FIG. 2 is parsed into two (2) separate layers, namely, a narrower first layer 30 and an outer shear layer 80. It can be generally said that the first layer 30 of FIG. 2 combines shear layer 80 of FIG. 4 with the narrower first layer 30 of FIG. 3 to provide the elongated first layer 30 of FIG. 2, or stated differently, the shear layer 180 of FIG. 4 is extended in FIG. 2 to provide the elongated first layer 30 as described.

With continued reference to FIG. 2, in addition to extending substantially across the full bead width $W_{20}$, it is appreciated that second layer of rubber material 40 may extend further toward the interior and/or exterior sides $10S_i$, $10S_e$ of the tire. In the example shown, the second layer of rubber material 40 within each bead area 12 extends from an exterior side $10S_e$ of the tire to an interior side $10S_i$ of the tire. It is further noted that in the example shown, the second layer of rubber material 40 is arranged to form an exterior surface of the tire, although in other variations, second layer may remain internal (at least partially) with one or more additional layers of material arranged external to the second layer.

Figure 3:
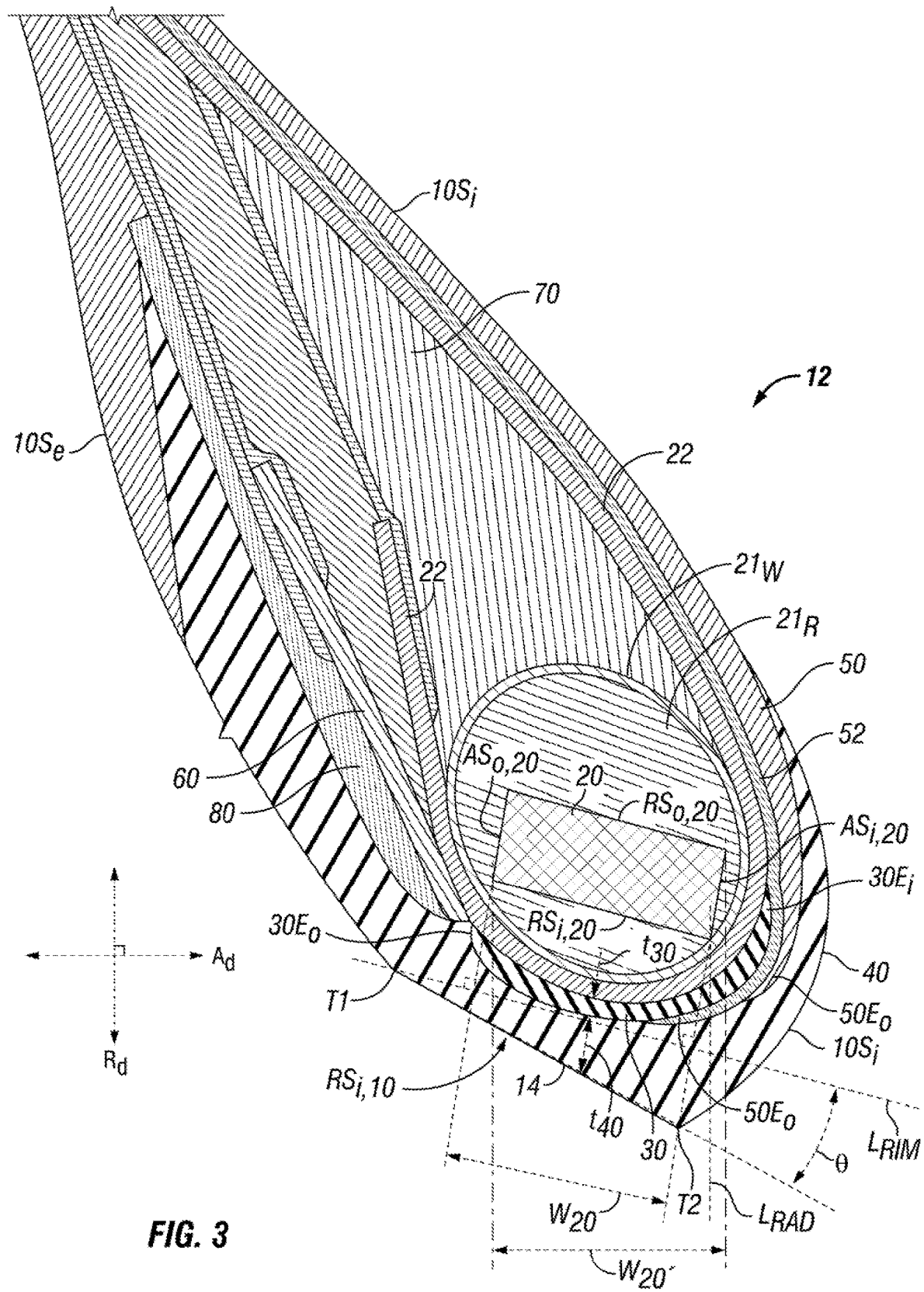
FIG. 3 is a perspective view of a bead portion located at the radially inner end of a sidewall, in accordance with another exemplary embodiment; and, FIG. 4 is a perspective view of a bead portion located at the radially inner end of a sidewall, in accordance with the prior art.

By virtue of employing the first and second layers of rubber material 30, 40 as described herein, improved resistance to mounting and dismounting damage is achieved, where the resilient first (inner) layer 30 permits improved stress-strain distribution to thereby reduce stress-strain density (concentrations) when the second (outer) layer experiences tire mounting and dismounting forces. It is noted that the bead area construction shown in FIGS. 2-4 represent bead area constructions employed by any over-the-road or off-road truck tires, as there is a greater propensity for experience bead-area damage due to the more frequent mounting and dismounting of tires, which are often retreaded and returned to service. Still, utilization of the inner and outer layers of rubber material 30, 40 as described and contemplated herein may be employed by other pneumatic tires, such as passenger car tires, light truck tires, high performance tires, and motorcycle tires, for example.

To the extent used, the terms "comprising," "including," and "having," or any variation thereof, as used in the claims and/or specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the embodiments. Ranges that are described as being "between a and b" are inclusive of the values for "a" and "b" unless otherwise specified.

While various improvements have been described herein with reference to particular embodiments thereof, it shall be understood that such description is by way of illustration only and should not be construed as limiting the scope of any claimed invention. Accordingly, the scope and content of any claimed invention is to be defined only by the terms of the following claims, in the present form or as amended during prosecution or pursued in any continuation application. Furthermore, it is understood that the features of any specific embodiment discussed herein may be combined with one or more features of any one or more embodiments otherwise discussed or contemplated herein unless otherwise stated.

What is claimed is:

1. A pneumatic tire comprising:
   a pair of annular bead areas spaced apart axially along a rotational axis of the tire;
   a pair of sidewalls spaced apart axially along the rotational axis of the tire, each sidewall of the pair of sidewalls extending outwardly in a radial direction from one bead area of the pair of bead areas; and,
   a crown portion arranged between the pair of sidewalls;
   where for each bead area of the pair of bead areas, a carcass ply wraps around a radial inner side of a bead ring such that the carcass ply extends along an axial outer side of the bead ring, across a radial inner side of the bead ring, and an axial inner side of the bead ring, the carcass ply comprising an array of reinforcements arranged within a matrix of elastomeric material,
   where a first layer of rubber material extends to an inner terminal end that overlaps an outer terminal end of an inner liner ply, the inner liner ply being an air impermeable layer, and where, before engaging the inner liner ply, the first layer of rubber material overlaps a second liner ply which is formed of rubber material, and where the inner liner ply is arranged between the tire carcass ply and an interior side of the tire, and the second liner ply is arranged between the inner liner ply and the carcass ply, where for each bead area of the pair of bead areas, the first layer of rubber material is arranged radially inward from both the bead ring radial inner side and the carcass ply, where for each bead area of the pair of bead areas, a second layer of rubber material is arranged radially inward from each of the bead ring radial inner side, the carcass ply, and the first layer of rubber material, each of the first layer of rubber material and the second layer of rubber material extending substantially across a full width of the corresponding bead ring, where the first layer of rubber material is arranged adjacent to the carcass ply and the second layer of rubber material is arranged adjacent to the first layer of rubber material, each of the first layer of rubber material and the second layer of rubber material having a modulus of elongation, where the modulus of elongation of the second layer of rubber material is equal to or greater than substantially 125% of the modulus of elongation of the first layer of rubber material, where the modulus of elongation for the first layer of rubber material is 3 to 6 MPa and the modulus of elongation for the second layer of rubber material is 6 to 8 MPa, the modulus of elongation is measured at 10% strain at a temperature of 23° C. based on ASTM Standard D412 on dumb bell test pieces, the measurements are taken in the second elongation and the measurements are secant moduli in MPa, based on the original cross section of the test piece.

2. The pneumatic tire of claim 1, where the modulus of elongation of the second layer of rubber material is equal to 150% to 250% of the modulus of elongation of the first layer of rubber material.

3. The pneumatic tire of claim 1, where the modulus of elongation of the second layer of rubber material at least equal to or greater than substantially 200% of the modulus of elongation of the first layer of rubber material.

4. The pneumatic tire of claim 1, where the first layer of rubber material terminates at a location radially inward from the bead ring before extending radially outward along an axial outer side of the bead ring.

5. The pneumatic tire of claim 1, where the first layer of rubber material extends further towards an inner side of the tire from the bead ring width and engages or overlaps the inner liner ply.

6. The pneumatic tire of claim 1, where the second layer of rubber material extends from an outer side of the tire to an inner side of the tire.

7. The pneumatic tire of claim 1, where the second layer of rubber material is arranged to form an exterior surface of the tire.

8. The pneumatic tire of claim 1, where the full width of the bead ring extends in a direction parallel to a reference line, the reference line biased towards the bead ring by substantially 0 to 15 degrees from a rim sealing portion of the bead area arranged along a radial inner side of the bead area.

9. The pneumatic tire of claim 1, where the full width of the bead ring extends in an axial direction of the tire.

10. The pneumatic tire of claim 1, where the first layer of rubber material has a thickness and the second layer of rubber material has a thickness, where the thickness of the first layer of rubber material arranged radially inward of the bead ring radial inner side is at least substantially 1 millimeter thick and up to substantially 50% of a distance extending from the carcass ply and to the inner radial side of the tire and where the thickness of the second layer of rubber material arranged radially inward of the bead ring radial inner side is at least substantially 1 millimeter thick and up to an amount that fills the remaining distance between the carcass ply and to the inner radial side of the tire in combination with the first layer of rubber material.

11. The pneumatic tire of claim 1, where the first layer of rubber material extends beyond the full width of the bead ring towards an outer side of the tire, the first layer of rubber material extending radially outward along an axial outer side of the bead ring.

12. The pneumatic tire of claim 11, where in extending radially outward the first layer of rubber material extends radially outward beyond the bead ring and along a reinforcement ply, the reinforcement ply arranged at least partially adjacent to the carcass ply and along an axially outer side of the bead ring.

13. The pneumatic tire of claim 12, where the reinforcement ply extends radially outward from a location along an axially outer side of the bead ring and to a location radially outward from the bead below a radial outward terminal end of a rubber filler arranged adjacent to a radially outer side of the bead ring, the rubber filler extending outwardly therefrom to the radially outward terminal end.

* * * * *